March 7, 1944. O. BRUMMER 2,343,366
TIRE LOCK
Filed Feb. 28, 1942
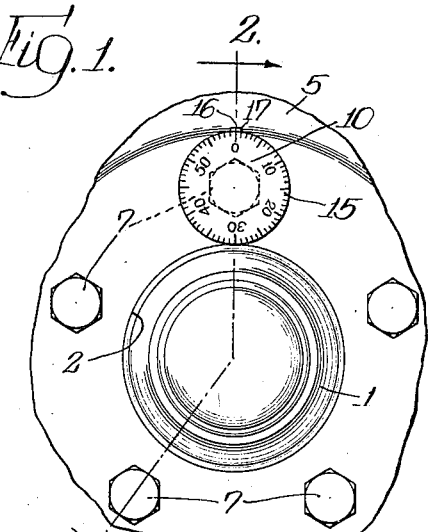
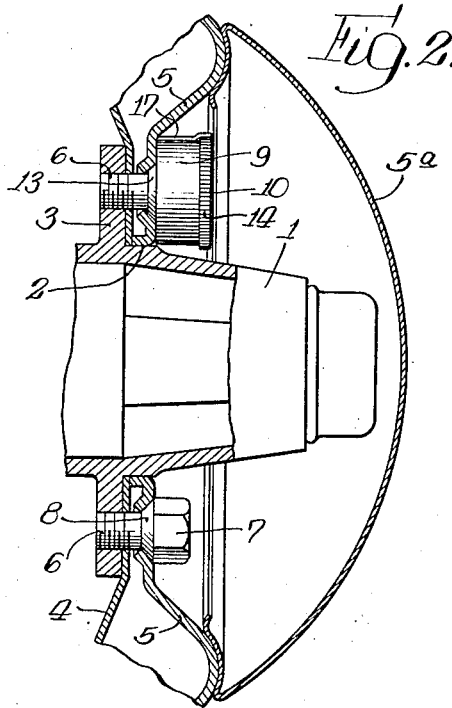
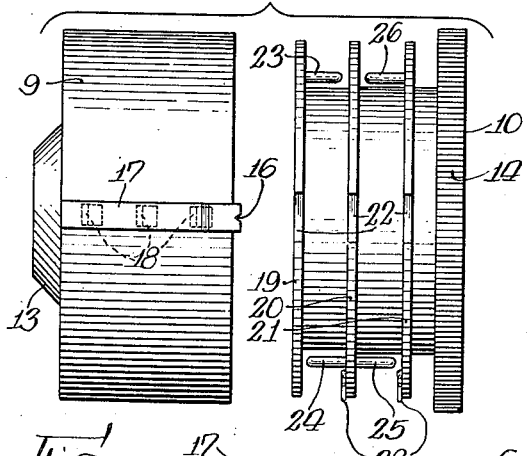
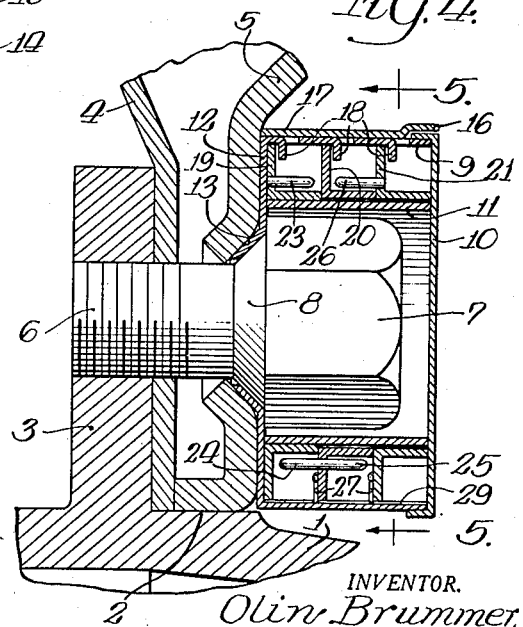
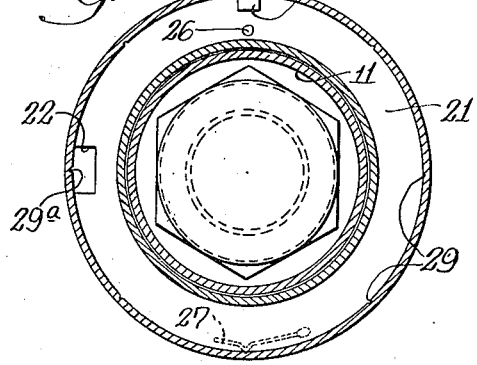
INVENTOR.
Olin Brummer,
BY Osgood H. Dowell
Atty.

Patented Mar. 7, 1944

2,343,366

UNITED STATES PATENT OFFICE 2,343,366

TIRE LOCK

Olin Brummer, Oak Park, Ill., assignor of one-half to Joseph E. Barss, Riverside, Ill.

Application February 28, 1942, Serial No. 432,848

5 Claims. (Cl. 70—232)

Frequency of thefts of wheel tires from automobiles makes it desirable to provide for protecttion against such thefts by locking means. Modern automobiles are equipped with so-called demountable wheels or annular tire-carrying members demountable from the wheel hubs. Because of the mud guards and fenders associated with the wheels, it is impractical to remove a tire from a wheel without first demounting the wheel, nor can the wheel be demounted in assembly with its hub and brake drum housing fast to the hub. On the other hand, the demounting of a demountable wheel is easily accomplished by jacking up the wheel axle, removing the wheel dust cap, detaching the cap screws or fastening nuts of the bolts by which the demountable wheel is fastened to the brake drum housing or other part rigid with the hub, and then withdrawing the wheel from the hub. Thefts of tires from such automobiles are therefore relatively easy, and are likely to involve thefts of the expensive demountable wheels together with the tires. In view of this situation, the importance of the provision of practicable means for locking a demountable automobile wheel in its mounted position on the wheel hub will therefore be apparent.

This invention relates to a lock of the type adapted for application to a bolt or screw fastener to prevent unauthorized unfastening thereof and thereby to lock an element or structure in attached relation to another element or structure to which it is connected by such fastener or by a number of such fasteners. The type of lock referred to comprises members cooperable to encase the manipulatable part of such fastener, e. g., the fastening nut of a bolt or the head of a screw, and means for releasably locking said members in assembly; one of said members or the lock housing constituted by the members in assembly having an apertured part for insertion therethrough of the shank of such bolt or screw, which apertured part is adapted to be clamped between said nut or head of such screw and the adjacent one of the elements connected by such bolt or screw.

The invention aims to provide an improved lock of said type, having in view particularly the provision of such a lock which can be applied in connection with one of the cap screws or bolts by which a demountable automobile wheel is secured on its hub or to its brake drum housing or other part rigid with such hub, and which, by the locking of such cap screw or bolt against unauthorized manipulation and unfastening, will afford practicable, convenient and reliable means for locking the demountable wheel in its mounted position on the wheel hub.

A specific object is the provision of a lock of said type comprising a cup and closure therefor with locking mechanism of the combination-controlled type encased in the assembled condition of the lock and operable for releasing or unlocking by a predetermined combination of rotative movements of the closure, the latter functioning as the rotative dialing member of a combination-controlled type of lock.

A further object is the provision of such a lock of very simple construction and susceptible of embodiment in a form for economical manufacture.

Further objects more or less subsidiary or auxiliary to those above stated will be apparent from the following description with reference to an illustrative embodiment of the invention shown in the accompanying drawing, in which:

Fig. 1 is a front elevation of the central portion of a demountable automobile wheel and the hub on which it is mounted, the dust cap of said demountable wheel being removed; this view revealing the heads of a circular series of cap screws by which the demountable wheel is removably attached in its mounted position, and a lock embodying the invention being shown in connection with one of such cap screws to prevent unauthorized unfastening thereof and thereby to lock the demountable wheel against unauthorized demounting.

Fig. 2 is a vertical sectional view taken on the line 2—2 of Fig. 1.

Fig. 3 is a plan view of the illustrative lock with its cup and closure members disassembled but in a relative position for assembly, the locking mechanism carried by the closure member being adjusted to position to permit its insertion into the cup member.

Fig. 4 is a central longitudinal section of the illustrative lock installed in connection with one of the cap screws aforesaid, the locking mechanism being in locking condition.

Fig. 5 is a cross section taken on the line 5—5 of Fig. 4.

In the drawing, 1 denotes an automobile wheel hub, 2 a shoulder thereon, and 3 a flange integral with the hub. To the flange 3 is rigidly affixed a brake drum housing of which a portion is shown at 4. The hub 1 is secured by any suitable means on the wheel axle, being fast thereto in the case of a rear driving wheel axle and rotatably mounted thereon in the case of a front wheel axle not driven from the motor of the vehicle. Fitted on the hub shoulder 2, and removably attached by cap screws to the hub flange 3, is a demountable automobile wheel 5 of which only the central portion is shown. A wheel tire, not shown, may be assumed to be mounted on the rim of this so-called demountable wheel which is a tire-carrying annulus demountable from the wheel hub. For attachment of the demountable wheel to the hub flange, either cap screws or bolts of the stud type are commonly employed. Cap screws are shown in this instance, for illustration, the shanks of said cap screws being designated by the numeral 6 and the heads thereof being designated by the numeral 7. It will be understood that the shanks of the cap screws, passing through holes therefor in the demountable wheel, are in screw-threaded engagement with screw holes in the hub flange, and that the demountable wheel is rigidly clamped between said hub flange and the heads of the cap screws, the latter being preferably hexagonal or nut-shaped for engagement by a wrench for tightening the connections afforded by said cap screws. In accordance with conventional practice, the holes in the demountable wheel are countersunk, forming conical seats in said demountable wheel around said holes, and the cap screw heads 7 are formed on their back sides with correspondingly formed conical protuberances 8 which fit in said seats, whereby to insure proper centering of the demountable wheel and to assist in transferring load from the hub through the cap screws to the demountable wheel. The wheel has a removable dust cap 5ª.

Connected to one of said cap screws is a lock comprising a pair of members cooperable to encase the head of such cap screw. One of said members is a cup 9 receiving the head of such cap screw and having an annular base through the central hole in which the shank of such cap screw is inserted. The other member, functioning as a closure for said cup, comprises a rotatable head 10 having a coaxial tubular boss 11 projecting therefrom and carrying relatively rotatable elements of a locking mechanism of the combination-controlled type, said boss and elements in assembly and the cup being insertable one within the other and the closure being adapted for a locked swiveled connection to the cup by coaction of said elements with keeper means fixed to the cup. As will be readily understood from the drawing, the annular base of the cup 9 is clamped washer-like between the demountable wheel 5 and the head 7 of such cap screw. Said annular base 12 of the cup is shown formed with a central conical flange 13 which fits in the correspondingly formed seat in the demountable wheel 5. The conical protuberance 8 on the cap screw head 7 seats in said flange 13. The cylindrical body of the cup 9 is of large enough inside diameter to permit manipulation therein by a suitable socket wrench of the nut-shaped cap screw head 7 for tightening the fastening afforded by the cap screw.

The closure head 10 functions as a rotary dialing knob whereby to operate the previously mentioned locking elements to unlocking or releasing position, so as to permit separation of the closure from the cup. The closure head 10 is shown in the form of a circular plate having a circumferential flange 14 fitting closely but rotatably around the mouth of the cup; the exterior surface of said flange being milled or roughened to facilitate manipulation or rotation of the closure by the fingers. A dial on the face of the closure head 10 is indicated at 15 in Fig. 1. In operating the locking elements to release position, certain divisions of the dial are brought successively into registration with a pointer represented in this instance by a notch 16 in a bar 17 fixed to the cup 9.

Keeper means fixed to the cup 9 for coaction with the previously mentioned locking elements are represented by lugs or projections 18 shown in Figs. 4 and 5. These keeper lugs could project through holes in the cup from a keeper bar fixed to the cup, but in the construction shown said lugs are punched or extruded from the cup, the latter being formed as a metal stamping, and the pointer bar 17 is fixed to the cup over the holes formed by the punching or extruding of said keeper lugs from the cup.

The locking elements previously mentioned are represented by a plurality of rings or ring tumblers 19, 20 and 21, fitted on the tubular boss 11 and also fitting within the cup 9, these locking rings being relatively rotatable but non-displaceable axially relative to said boss. The keeper lugs or projections 18 are at the front sides of these locking rings, by coaction with which the rings lock the closure to the cup. As the locking rings fit both the boss 11 and the interior of the cup 9, they provide a journal for rotation of the closure head about its axis. The locking rings are shown as L-shaped in cross section, the inner cylindrical parts thereof functioning as spacers; however, the rings could be simple flat rings spaced by separate spacer rings.

It will be observed that the boss 11 with the locking rings 19, 20 and 21 carried thereby is insertable into the cup 9 around the cap screw head 7 contained in the cup. To permit this insertion, the locking rings must first be adjusted relative to the cup to the position shown in Fig. 3, with the ring notches 22 in registration with the keeper lugs 18 so as to permit the locking rings to be moved axially past the keeper lugs. After such insertion, a rotation of the closure will derange the rings from the relationship shown in Fig. 3, thereby locking the closure to the cup.

The rearmost locking ring 19, which may be referred to as a driver ring, is fast to or in driving connection with the tubular boss 11, the latter being fast to the closure head 10. The other locking rings 20 and 21 are freely rotatable on said boss, except that the ring 20 may be picked up and driven by the ring 19, and the ring 21 may be picked up and driven by the ring 20 when the latter is being driven. Suitable means, presently to be referred to, are provided to prevent rotation of the rings 20 and 21 by frictional contact with the boss 11 or by frictional contact with each other. To enable the rings 20 and 21 to be successively picked up and driven, the several rings are provided with coactive abutment means represented by a forwardly projecting pin 23 on the driver ring 19, a pin 24 on the second ring 20 projecting in the path of revolution of the pin 23, a forwardly projecting pin 25 on said second ring 20, and a pin 26 on the third ring 21 projecting in the path of revolution of the pin 25.

To unlock the lock, the locking rings 19, 20 and 21 are set in release position or in registration with the keeper lugs 18 by a predetermined combination of opposite operations of the closure 10, in accordance with the general principle of operation of an ordinary combination lock. Assume, for example, that in order to unlock it is necessary to turn the closure several turns to the right and to stop with a certain division of the dial in registration with the pointer, then to turn the closure to the left through a certain angular distance, and then to turn it to the right through a certain angular distance, these distances being determined by the dial and coacting pointer. In the first of these operations of the closure the driver ring 19 rotating in a clockwise direction will in time pick up and drive the second ring 20 which in turning will pick up and drive the third ring 21, stopping with said third ring 21 set in position for release, i. e., with its notch 22 in line with the keeper lugs 18. In the second or reverse operation of the closure, the driver ring 19 rotating in a counter-clockwise direction will in the course of its rotation pick up and drive the second ring 20, stopping with said ring 20 set in release position. In the third operation of the closure, the driver ring 19 will alone be rotated in a clockwise direction, stopping with its notch 22 in release position. The several rings can now be withdrawn from the cup 9, permitting separation of the closure 10 therefrom.

It will be understood that the particular combination of manipulative operations of the closure which must be worked for unlocking will depend upon the positions of the pins 23, 24, 25 and 26 on the respective locking rings 19, 20 and 21, and that in many different locks embodying the invention the pins will be set at different positions on said rings, or at different positions in relation to the ring notches 22; so that each lock in a great many will be worked by or in accordance with a combination different from that of any other.

During the unlocking operation, the rings 20 and 21, after they have been successively brought to release position, must remain stationary in such position notwithstanding ensuing operation or operations of the closure. Suitable braking means is therefore provided to prevent accidental turning of said rings 20 and 21 or either of them by frictional contact with the boss 11 or with each other or by frictional contact of the ring 21 with the closure head 10. A simple braking means provided for this purpose comprises small spring wires 27 affixed laterally to said rings 20 and 21 and bearing frictionally against the interior of the cup 9; these spring wires having small humps or crimps 28 which are resiliently pressed against the cup and may engage slight notches 29 in the interior surface of the cup. The arrangement is preferably such that when the rings 20 and 21 are in release position, the humps 28 of their respective spring wires 27 will both engage in the particular notch designated by the reference symbol 29ª, though the spring wires could be arranged to engage any of said notches, or they could be arranged so that one would engage with one notch and the other with a different notch. By providing a plurality of notches 28 at spaced intervals, the advantage is gained that as the rings 20 and 21 are turned by rotation of the closure head 10 a click is heard every time one of the spring wires 27 passes a notch, thus interfering with any attempt to detect the lock combination by hearing or listening for clicking noises incidental to the operation.

Obviously the lock herein shown and described could be used as well in connection with a bolt fastener as with a cap screw. In the case of a demountable automobile wheel fastened in place by stud bolts, the shanks thereof attached to the hub flange 3 would pass through the bolt holes in the central part of the demountable wheel, and fastening nuts would be screwed on said shanks against said demountable wheel, clamping the latter rigidly to the hub flange. In applying the lock embodying the present invention to a demountable wheel so fastened, the base of the cup 9 would be slipped over one of the bolt studs or shanks and its fastening nut would then be screwed thereon within the cup and against said base, clamping the latter between said nut and demountable wheel in the same manner in which it is clamped between a cap screw head 7 and said wheel in Figs. 2 and 3 of the drawing. In the drawing, the parts designated 6 may be considered as typifying the shanks of either fastening bolts or cap screws, and the parts designated 7 may be considered as typifying either cap screw heads or fastening nuts screwed on bolt studs.

The lock is of very simple character and construction, occupies but very little more space around the head of the cap screw or fastening nut of the bolt to which it is connected than is required for accommodation of the socket end of a socket wrench applied to such cap screw head or nut for tightening the fastener, and is therefore practicable for installation in the restricted space available around the hub on which is mounted a demountable automobile wheel. The lock is convenient to install, and obviates the need of and additional expense and objections incident to the use of a key. When installed and locked, it affords practical means for preventing unauthorized demounting of the demountable wheel, and indirectly locks the tires since, on account of the mud guards or fenders associated with modern automobile wheels, the demounting of a wheel tire without first demounting a wheel would be so difficult that a would-be tire thief would not ordinarily attempt it.

Because of the simple character of the lock, the parts thereof other than the small spring wires 27 are susceptible of economical manufacture as metal stampings, though the invention in its broader aspects is not intended to be limited to a sheet metal construction. The marginally flanged closure head 10 may be made as a metal stamping, and its tubular boss 11 may be made as a cylindrical stamping and welded to the head 10; though the closure could be made as a die forging with the boss 11 integral with the head or rigidly secured thereto in any suitable manner. The cup 9 may be made as a metal stamping with the keeper lugs 18 extended therefrom and with the pointer bar 17 welded to the cup over the holes left by the extrusion of said keeper lugs, so as to prevent picking the lock through such holes. However the keeper lugs could be otherwise formed or provided as projections from the cup or from a keeper bar affixed thereto. For example, the cup, whether made as a stamping or as a die forging, could be formed with a slot in its inner surface in which such a keeper bar could be secured.

The flange 14 fitting closely around the mouth of the cup would interfere with insertion of a tool between the cup and the closure for prying off the latter. Breakage of the lock either by cutting through the cup 9 or by prying off the closure would be difficult and would require special tools with which the ordinary tire thief would probably not be supplied.

It is contemplated that locks embodying the invention will be furnished in sets of five, so that automobile owners may apply them to the four wheels and also to the spare tires of their car.

The invention or embodiments thereof may be used for locking demountable tire-carrying wheel rims to wheel bodies and to supports for spare tires, and for other purposes where it is desired to lock one element or structure to another by locking a bolt, screw or other threaded fastener connecting them.

It will be understood that the invention is not limited to the particular embodiment shown and described.

I claim:

1. A locking device whereby to prevent unauthorized unfastening of a bolt or screw connecting two elements, said device comprising a pair of members cooperable to encase the fastening nut of such bolt or head of such screw, one of said members being a cup with a central hole in its base and adapted to be connected to such bolt or screw with the shank thereof inserted through said hole and said nut or screw head within said cup, the other member adapted to provide a closure for said cup and comprising a rotatable head with a tubular boss projecting therefrom and adapted to enclose said nut or screw head, a plurality of relatively rotatable locking rings carried by said boss and non-displaceable axially relative thereto, said boss and rings in assembly being insertible within the cup around said nut or screw head, said rings in the locked condition of the device being around said nut or screw head between it and the surrounding body of the cup, means on said cup with which said rings are cooperable for lockingly connecting said members after said assembly is within the cup, said rings being operable by a predetermined combination of rotative movements of said head to unlocking position whereby to permit separation of said members.

2. A locking device for uses such as described comprising a cup adapted for insertion of a threaded stem through its base and within which a fastening nut can be applied to and screwed on said stem, a closure therefor having a tubular protrusion within the cup adapted to enclose said nut, and combination-controlled locking means carried by said protrusion and cooperable with the cup to lock said closure thereto, said locking means in the locked condition of the device being around said nut between it and the surrounding body of the cup, the closure when locked being rotatable, and said locking means being operable to effect unlocking of the closure by a predetermined combination of rotative movements thereof.

3. A lock of the character described comprising a cup having a central hole in its base, said cup adapted to receive the head of a cap screw or fastening nut of a bolt the shank of which is inserted through said hole, a closure therefor adapted for locked swiveled connection thereto, said closure comprising a rotatable head with a coaxial tubular boss insertible into the cup and adapted to enclose said screw head or nut, locking rings fitted on said boss and fitting within said cup, said locking rings being relatively rotatable but non-displaceable axially relative to said boss and one of them being in driving connection with said boss, said rings in the locked condition of the device being around said nut or screw head between it and the surrounding body of the cup, and keeper means fixed to the cup with which said locking rings coact to effect a locked swiveled connection of said closure to the cup, said locking rings being operable by a predetermined combination of rotative movements of said closure to a release position permitting separation of said closure from said cup.

4. A lock according to claim 3 wherein said cup is a metal stamping with keeper lugs extruded therefrom and provided with a pointer bar welded to the exterior of the cup over the places or holes from which said lugs are extruded.

5. A lock according to claim 3 wherein the locking rings other than the one in driving connection with said boss are provided with laterally attached small spring wires bearing frictionally against the cup, the latter having a slight notch or notches and said spring wires having detent portions for engagement therein to hold said rings stationary in their release positions.

OLIN BRUMMER.